United States Patent [19]

Cogdell, Jr.

[11] 4,356,519

[45] Oct. 26, 1982

[54] PORTABLE ANSWERING DEVICE

[76] Inventor: Lawrence A. Cogdell, Jr., 8750 E. McDowell Apt. #18, Scottsdale, Ariz. 85257

[21] Appl. No.: 123,929

[22] Filed: Feb. 25, 1980

[51] Int. Cl.³ .................. G11B 31/00; G11B 5/00; H04M 11/02
[52] U.S. Cl. .................. 360/61; 369/7; 360/137; 179/2 EC; 340/311.1; 340/825.44; 455/344
[58] Field of Search ................ 179/100.1 R, 100.11, 179/6 R, 6 E, 100.1 A, 2 EC, 6.01, 6.07; 360/31, 60, 61, 137, 74.1; 340/311, 311.1, 825.44; 369/6, 7, 10, 11; 455/344

[56] References Cited

U.S. PATENT DOCUMENTS

| 3,716,848 | 2/1973 | Schonholtey | 340/311 |
| 3,846,783 | 11/1974 | Apsell | 455/38 |
| 3,944,724 | 3/1976 | Kilby | 178/30 |
| 3,976,995 | 8/1976 | Sebestyen | 340/311 |
| 4,011,586 | 3/1977 | Pastor | 360/31 |
| 4,021,856 | 5/1977 | Totoyama | 360/93 |
| 4,041,250 | 8/1977 | Sato | 369/11 |
| 4,069,397 | 1/1978 | Hashimoto | 179/6 R |
| 4,109,115 | 8/1978 | Yamamoto | 369/10 |
| 4,152,547 | 5/1979 | Theis | 179/6 R |
| 4,197,497 | 4/1980 | Phelps | 179/100.1 A |

OTHER PUBLICATIONS

Plectron Corp. brochure.

Primary Examiner—Alan Faber
Attorney, Agent, or Firm—Harry M. Weiss

[57] ABSTRACT

A portable paging device comprises a beeper portion for real time listening of a received message and a magnetic tape recorder for recording a received message and playing it back at the convenience of the recipient. After a message has been recorded, an indication is given which may be reset after the message has been played. Means are provided to disable the tape recording portion of the device if an end of tape signal has been generated or if there is no tape in the tape recording portion.

2 Claims, 2 Drawing Figures

PORTABLE ANSWERING DEVICE

BACKGROUND OF THE INVENTION

1. Field of the Invention

This invention relates generally to paging systems and, more particularly, to a portable answering service wherein a hand-held pager records on magnetic tape the message transmitted, such that the recipient may play the message back at his convenience.

2. Description of the Prior Art

It is common practice to provide pagers which emit an audible tone indicating that a particular recipient is to receive a message. Thereafter, the message is transmitted via voice communication to the recipient whether or not this recipient is ready to receive the message. For example, the recipient may be in a high noise environment and not be able to hear the message. Also, the content of the message may be lost, if either the recipient cannot remember the message or a pencil and paper was not immediately available to transcribe the message. Attempts to solve these problems involve the use of complex printers (e.g. U.S. Pat. No. 3,944,724 and U.S. Pat. No. 4,021,608) and complex display systems (e.g. U.S. Pat. No. 3,976,995 and U.S. Pat. No. 4,091,373) at the receiving end.

SUMMARY OF THE INVENTION

It is an object of the present invention to provide a portable answering service in which a message transmitted to a recipient is stored in a hand-held pager unit for readout at the recipient's convenience.

It is a further object of the invention to provide a pager which records a transmitted message or magnetic tape for subsequent playback by the recipient.

Finally, it is an object of the invention to provide a pager which is simple, inexpensive, silent, and capable of storing the transmitted message.

According to a broad aspect of the invention, there is provided a portable electronic pager comprising first means for receiving a message, second means coupled to said first means for recording said message on magnetic tape, and third means coupled to said first means for delivering a real-time audio representation of said message.

The above objects, features, and advantages of the present invention will be better understood from the following detailed description taken in conjunction with the accompanying drawings, in which:

DESCRIPTION OF THE PREFERRED EMBODIMENT

Figure 1:
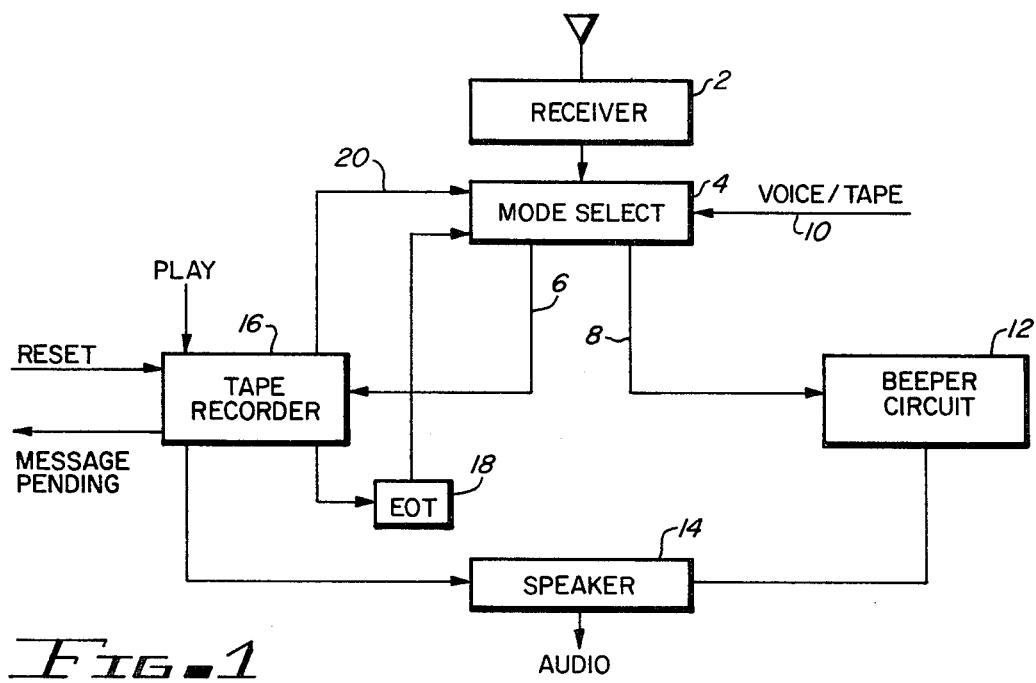
FIG. 1 is a block diagram of the inventive portable answering service.

Referring to FIG. 1, a message received by receiver 2 is applied to a mode select unit 4, which has first and second outputs 6 and 8, and a first input 10 denoted VOICE/TAPE. When the VOICE/TAPE input is in a first state (voice), the message received is routed through mode select 4 to beeper circuit 12 and from there to speaker 14 which reproduces the message in real time. When the VOICE/TAPE input is in a second state (tape), the received message is applied to tape recorder 16 where it is taped. After the message has been recorded, the tape recorder 16 generates a MESSAGE PENDING SIGNAL which may be an audio signal or a visual (LED) signal. At a subsequent time, a PLAY signal may be applied to recorder 16 which will cause the tape recorder to play back the message into speaker 14.

The system includes an END OF TAPE (EOT) unit 18 which monitors the tape in recorder 16. EOT unit 18 senses when the tape in recorder 16 has reached an end and generates an output which is applied to mode select unit 4. The occurrence of an EOT signal will cause the mode select 4 to switch to a VOICE mode automatically. Similarly, recorder 16 generates a NO TAPE signal on line 20 which will automatically place the mode select unit 4 in the VOICE mode.

Thus, in the VOICE mode, the beeper operates as any other beeper, and the tape recorder could be used, for example, as a pocket dictating device.

A suitable beeper for use in the system shown in FIG. 1 would be either the NEC Model No. PR-AUV2-3A or the Motorola Model No. AU1DVC2468-C. A suitable recorder would be a Lanier Mini-Cassette Recorder Model No. VPS-60 equipped with a Realistic End of Tape Sensor Model No. CTR-40.

Figure 2:
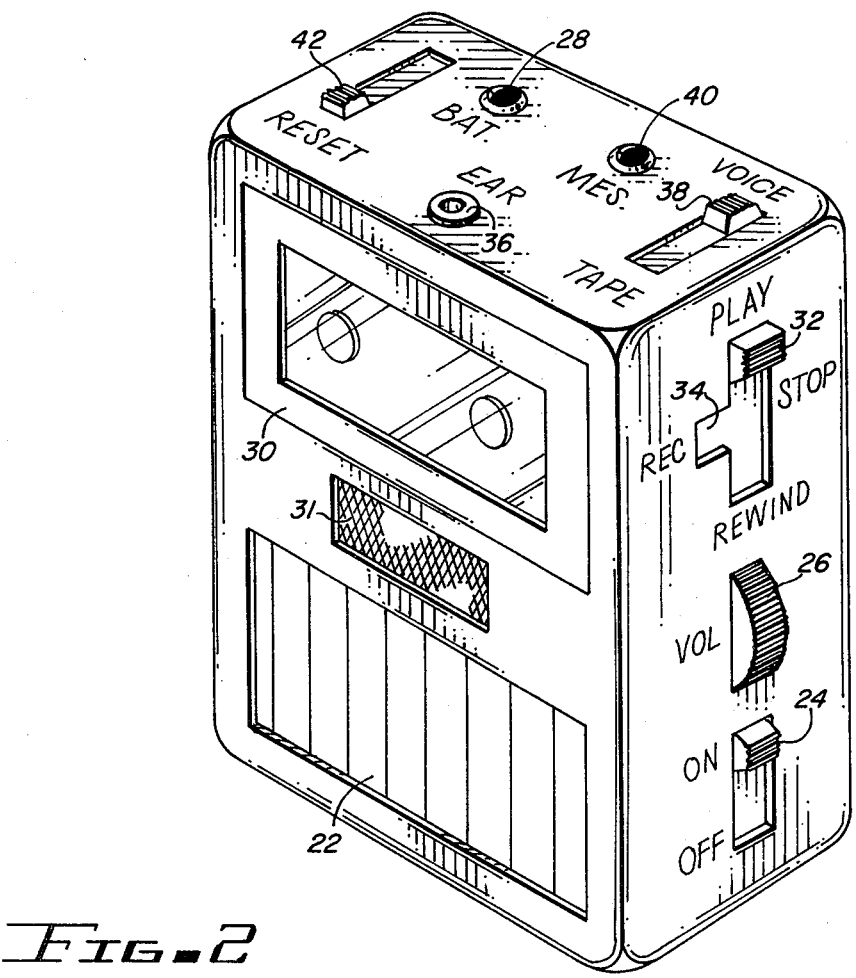
FIG. 2 is a diagrammatic representation of the portable answering service according to the invention.

FIG. 2 is a diagrammatic representation of the inventive portable answering device. As can be seen, the device is equipped with a speaker 22, an ON/OFF switch 24, a volume control 26, and a battery condition indicator 28 as is well known in the art. The tape recording portion of the device includes means for receiving a mini-cassette 30, a three position switch 32 having positions corresponding to PLAY, STOP, and REWIND, a microphone 31, and a record (REC) switch 34 as is well known in the tape recorder art. The device also includes an ear-phone jack 36 so as to permit private monitoring of received messages.

A VOICE/TAPE switch 38 activates either the beeper portion of the device (VOICE) or the tape recorder portion (TAPE) of the answering device. If the device is in the TAPE mode, a received message will be recorded on mini-cassette 30 and a message pending indicator (MES) 40 will be activated. Indicator 40 may be nothing more than a light emitting diode (LED). The recorded message may be played back by the intended receiver when it is convenient to do so. After the message has been played, the operator can activate reset control (RESET) 42 to reset the message pending indicator 40 only. As an added precaution, VOICE/TAPE switch 38 may be configured so that it would be impossible to place the switch in the TAPE position unless a mini-cassette were properly positioned within the device.

The device described will allow an operator to receive messages in high noise environments without disturbing others around him. An individual on call can feel free to shower, jog, or participate in other activities which would preclude the wearing or carrying of a beeper.

The above description is given by way of example only. Changes in form and details may be made by one skilled in the art without departing from the scope of the invention as defined by the appended claims. For example, once the receiver 2 has been activated, then following the receipt of the message, the receiver 2 is reset to receive another message. This can be accomplished by use of a time delay circuit which would function to automatically reset the receiver after a given period of time. Additionally, a fast forward operation can be implemented to wind the tape forward at a higher speed by means and use of the switch 32 which can be inserted inwardly to activate a fast forward circuit used to drive the tape forward.

What is claimed is:

1. A portable hand held electronic voice pager, comprising:
   first means for receiving an audio voice message;
   second means coupled to said first means for recording the received message on magnetic tape;
   third means coupled to said first means for delivering a real-time audio representation of said message; and
   a plurality of controls for operating said pager, each of said plurality of controls being operable by finger movements of the hand in which said pager is held, including fourth means for activating one of said second and third means, said fourth means comprises:
   generating means for generating a control signal having first and second states; and
   a mode select switch coupled to said tape recorder and to said third means and responsive to said control signal for activating said tape recorder or said third means, including fifth means for indicating when a message has been recorded on said tape recorder, including switch means for resetting said fifth means, sixth means coupled to said tape recorder and to said mode select switch for detecting end of tape and forcing said mode select switch to activate said third means.

2. A portable hand-held pager according to claim 1 further including seventh means for forcing said mode select switch to activate said third means when there is no tape in the recorder.

* * * * *